(12) United States Patent
Cheng

(10) Patent No.: US 8,777,242 B1
(45) Date of Patent: Jul. 15, 2014

(54) LINKAGE MECHANISM FOR DOUBLE-WHEEL COMBINATION OF VEHICLE

(71) Applicant: Bo-Sheng Cheng, Yaoyuan Hsien (TW)

(72) Inventor: Bo-Sheng Cheng, Yaoyuan Hsien (TW)

(73) Assignee: Bentech Marketing & Engineering Co., Ltd., Tainan (TW)

( * ) Notice: Subject to any disclaimer, the term of this patent is extended or adjusted under 35 U.S.C. 154(b) by 0 days.

(21) Appl. No.: 13/751,160

(22) Filed: Jan. 28, 2013

(51) Int. Cl.
*B60G 9/02* (2006.01)

(52) U.S. Cl.
USPC ...... 280/124.111; 280/124.103; 280/124.116; 280/5.506; 280/5.509; 180/210

(58) Field of Classification Search
USPC ............ 280/124.103, 124.109, 124.111, 280/124.116, 124.119, 5.502, 5.506, 5.507, 280/5.509, 5.511; 180/210, 213
See application file for complete search history.

(56) References Cited

U.S. PATENT DOCUMENTS

| | | | | |
|---|---|---|---|---|
| 3,692,324 A * | 9/1972 | Corbin | | 280/124.103 |
| 4,020,914 A * | 5/1977 | Trautwein | | 180/210 |
| 4,887,829 A * | 12/1989 | Prince | | 280/282 |
| 5,941,542 A * | 8/1999 | Kalman | | 280/38 |
| 6,402,174 B1 * | 6/2002 | Maurer | | 280/267 |
| 6,763,905 B2 * | 7/2004 | Cocco et al. | | 180/210 |
| 7,311,167 B2 * | 12/2007 | Takayanagi et al. | | 180/215 |
| 7,467,802 B2 * | 12/2008 | Peng et al. | | 280/124.103 |
| 7,530,419 B2 * | 5/2009 | Brudeli | | 180/210 |
| 7,591,337 B2 * | 9/2009 | Suhre et al. | | 180/210 |
| 7,722,063 B2 * | 5/2010 | Dieziger | | 280/124.103 |
| 7,887,070 B2 * | 2/2011 | Kirchner | | 280/124.103 |
| 7,967,306 B2 * | 6/2011 | Mighell | | 280/124.103 |
| 8,070,172 B1 * | 12/2011 | Smith et al. | | 280/124.103 |
| 2007/0151780 A1 * | 7/2007 | Tonoli et al. | | 180/65.1 |
| 2008/0012262 A1 * | 1/2008 | Carabelli et al. | | 280/124.106 |
| 2011/0006498 A1 * | 1/2011 | Mercier | | 280/124.103 |

* cited by examiner

*Primary Examiner* — Paul N Dickson
*Assistant Examiner* — Darlene P Condra

(57) ABSTRACT

A linkage mechanism for double-wheel combination of vehicle mainly includes a main frame, connecting rod, and two sway rods. With the simple assembly, the two sway rods are pivoted to the main frame and the connecting rod respectively so as to sway identically and simultaneously for better vehicle stability and mobility.

5 Claims, 8 Drawing Sheets

LINKAGE MECHANISM FOR DOUBLE-WHEEL COMBINATION OF VEHICLE

FIELD OF THE INVENTION

The present invention relates to linkage mechanism for vehicle, in particular to a linkage mechanism for combining two wheels for identical motion of sway.

DESCRIPTION OF THE PRIOR ART

Conventional motor vehicles such as motorcycles usually run on two wheels aligned on the same line for good mobility. However, normal single front wheel or single rear wheel is not stable under some circumstance and also not safe or suitable for the elder, unskilled, or handicapped.

Instead of single wheel for the front or rear wheel, a combination of two wheels can be used to highly improve the stability of the movement and operation of the vehicle. To maintain the stability and the mobility as well, the two combined wheels must be linked together for identical motion of tilt or sway. Therefore, to create a linkage mechanism capable of linking two wheels for identical motion of sway through a simple assembly with dust and rain proof is an urgent objective to achieve.

FIELD OF THE INVENTION

Accordingly, the primary object of the present invention is to provide a linkage mechanism to combine wheels of vehicle for identical motion of sway. Through the assembly, two wheels can be linked for providing better stability and mobility to vehicle. The simple assembly can also sustain the force of sway and protect most of the components from dust and moisture so as to prolong the lifetime of the assembly.

To achieve the above object, the present invention includes a linking block for receiving a center axle. A sway block is pivoted to the center axle, and a connecting rod is pivoted to the sway block. A main frame serves to retain two ends of the center axle. Two sway rods are pivoted to two ends of the main frame and the two ends of the connecting rod. Two wheels are arranged to the two sway rods so as to sway simultaneously and identically through the linking of the connecting rod.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 3, a preferable embodiment of a linkage mechanism for double-wheel combination of vehicle according to the present invention is illustrated. The linkage mechanism includes a main frame 10, linking block 11, center axle 12, connecting rod 13, and two sway rods 16, 17.

The center axle 12 is arranged to the linking block 11. A sway block 121 is pivoted to the center axle 11. The sway block 121 has two coaxial through holes 121A.

The connecting rod 13 has a through hole 130 so that the connecting rod 13 is pivoted to the sway block 121 through a shaft 120 penetrating the through holes 121A of the sway block 121 and the through hole 130 of the connecting rod 13.

The main frame 10 is assembled by a front frame 14 and a rear frame 15 through couplings and assembling holes 144 of the front frame 14 and assembling holes 154 of the rear frame 15. A through hole 141 is formed to the front frame 14 and a through hole 151 is formed to the rear frame 15. A front portion and a rear portion of the center axle 12 are received by the through holes 141 and 151 respectively so that the force applied to the center axle 12 will be sustained by the main frame 10. The front and the rear frame are preferably two case bodies to well protect most of the components of the linkage mechanism.

The sway rods 16 and 17 are pivoted to two lateral ends of the rear frame 15 and the two ends of the connecting rod 13.

Through above components, two wheels can be linked by the assembly for providing better stability and mobility to vehicle. The simple assembly of the main frame can sustain the force of sway and protect most of the components from dust and moisture so as to prolong the lifetime of the assembly.

Wherein, the sway rods 16 and 17 are covered by a side shield 18 respectively to protect the sway rods from dust and moisture so as to prolong the lifetime of the sway rods.

Referring to FIGS. 1 and 2, the connecting rod 13 is outside the main frame 10 for better accessibility of replacement and maintenance.

The symmetric sway rods 16 and 17 both have a rod body 171 having an upper section 172 and lower section 173. The outer diameters of the upper section 172 and lower section 173 are smaller than that of the rod body 171. The side shield 18 is an approximate cap body covering the sway rod. The side shield 18 has two through holes 181, 182 on the top and the bottom for receiving the upper section 171 and the lower section 173 of the sway rod 17 respectively. The rod body 171 has a front protruding axle 174 and a rear protruding axle 175 formed radially to the rod body 171. The front protruding axle 174 and the rear protruding axle 175 are coaxial. The rear frame 15 has a fork 155 on both lateral sides thereof for receiving the sway rods 16 and 17 respectively. The fork 155 has two coaxial through holes 155A for receiving the front protruding axle 174 and the rear axle 175 so that the sway rods 16 and 17 can be pivoted to the forks 155 of the rear frame 15.

The rod body 171 has a radial hole 176. The connecting rod 13 has a through hole 131 and 132 on both ends thereof. The through hole 131 and the radial hole 176 are penetrated by a coupling 13 so that the end of the connecting rod 13 is pivoted to the rod body 171. Another end of the connecting rods 13 is pivoted to the rod body 161 like the way mentioned above.

In one preferable embodiment, the smaller front frame 14 is embedded into a cut 150 of the rear frame 15 so that the integrated rear frame 15 will provide main support of the whole assembly.

Referring to FIG. 4, two wheels 2A and 2B are arranged to the linkage mechanism of the present invention, and the operations are illustrated in FIGS. 5 and 6.

Referring to FIGS. 7 and 8, another preferable embodiment of the present invention having different main frame than previous embodiment is illustrated. The main frame 10 is assembled by front and rear frames 14 and 15. Through holes 142 and 143 on two lateral ends of the front frame 14 and the through holes 152 and 153 on two lateral ends of the rear frame 15 are used to receive the protruding axles of the sway rods 16 and 17 so that the sway rods 16 and 17 is pivoted to the two ends of the main frame 10.

Through the through holes 131 and 132 on the two lateral ends of the connecting rod 13 linking to the axial holes 166 and 176 of the rod body 161 and 171 by the couplings 133, the connecting rod 13 is pivoted to the two sway rods 16 and 17.

The side shield 18 can cover the sway rod to protect the sway rod from dust and moisture from top to bottom so as to prolong the lifetime of said sway rod.

A balanced status of the linkage mechanism is shown in FIG. 9. The operations of the linkage mechanism are illustrated in FIGS. 10 and 11.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

Figure 1:
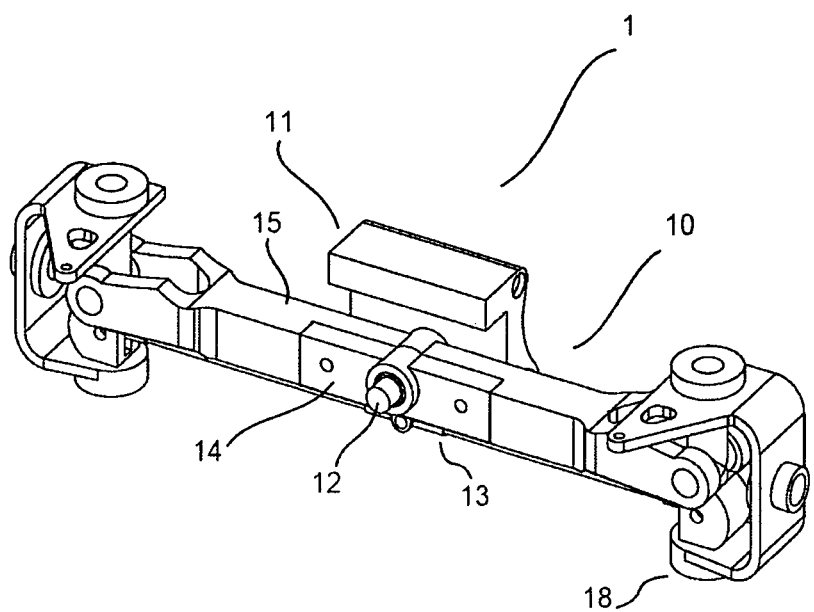
FIG. 1 is a schematic view of the first preferable embodiment of the present invention.
Figure 2:
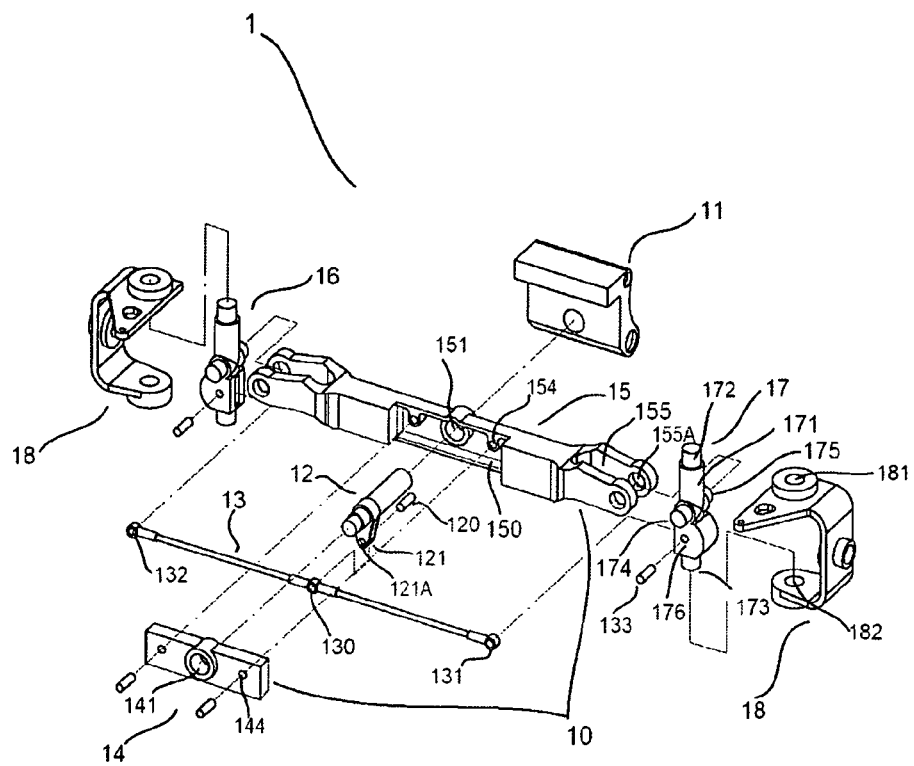
FIG. 2 is an exploded view showing the first preferable embodiment of the present invention.
Figure 3:
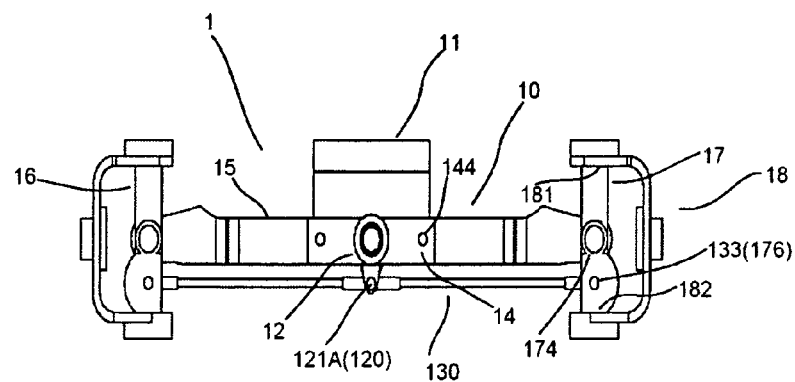
FIG. 3 is a front view showing the first embodiment of the present invention.
Figure 4:
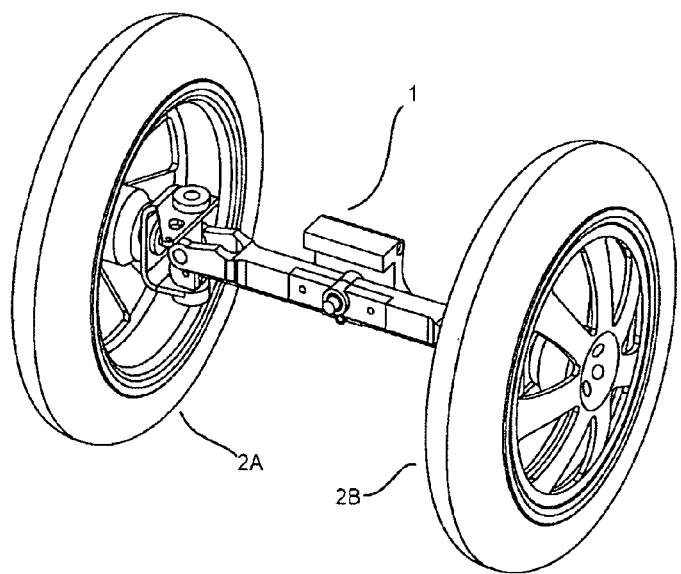
FIG. 4 is a schematic view showing the assembly of two wheels to the first embodiment of the present invention.
Figure 5:
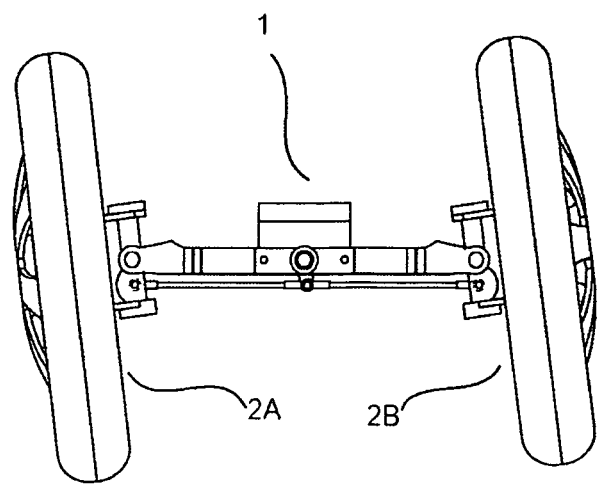
FIG. 5 is a schematic view showing the operation of sway of the first embodiment of the present invention.
Figure 6:
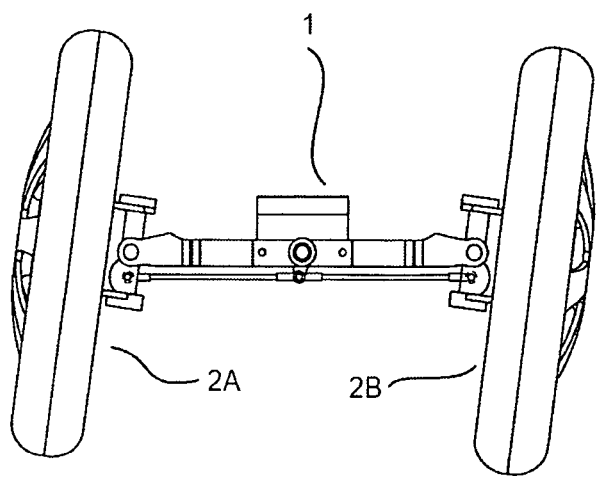
FIG. 6 is a schematic view showing another operation of sway of the first embodiment of the present invention.
Figure 7:
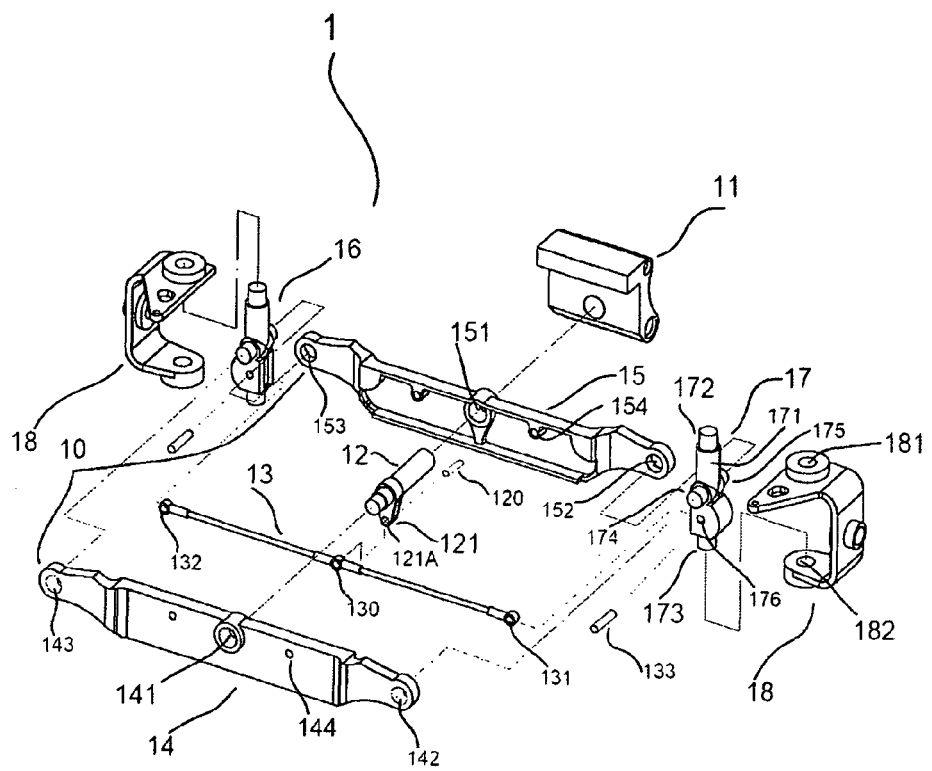
FIG. 7 is a schematic view of the second embodiment of the present invention.
Figure 8:
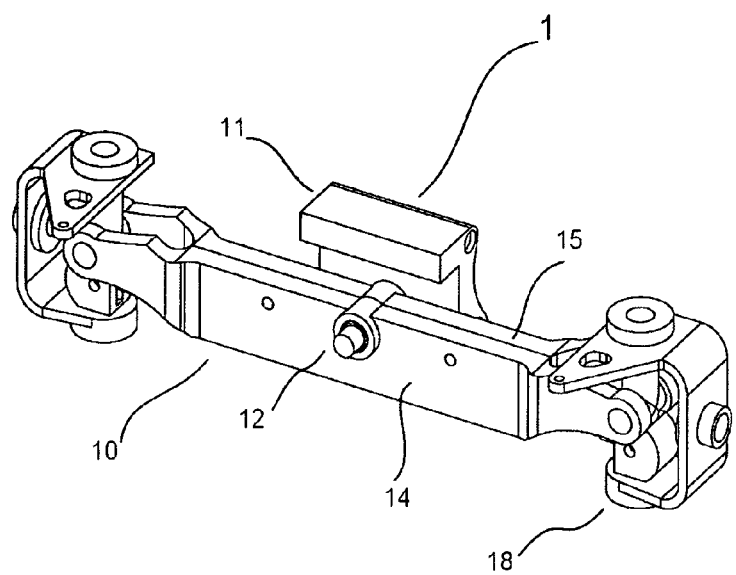
FIG. 8 is an exploded view of the second embodiment of the present invention.
Figure 9:
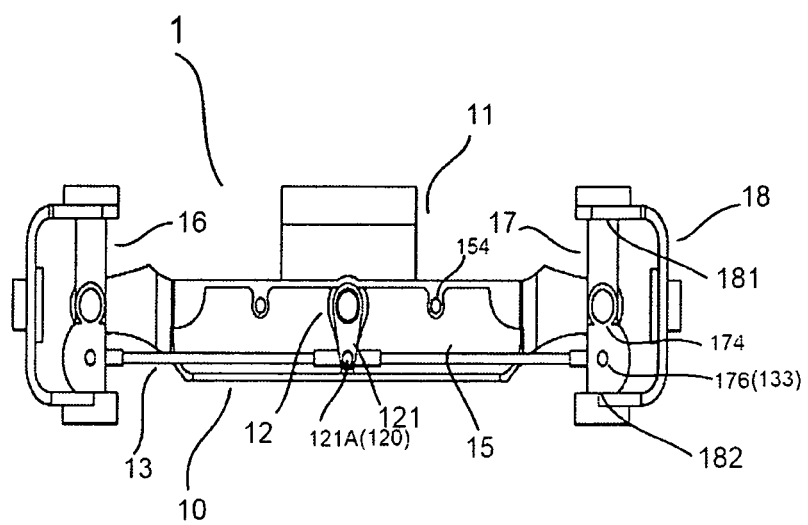
FIG. 9 is a front view showing the second embodiment of the present invention.
Figure 10:
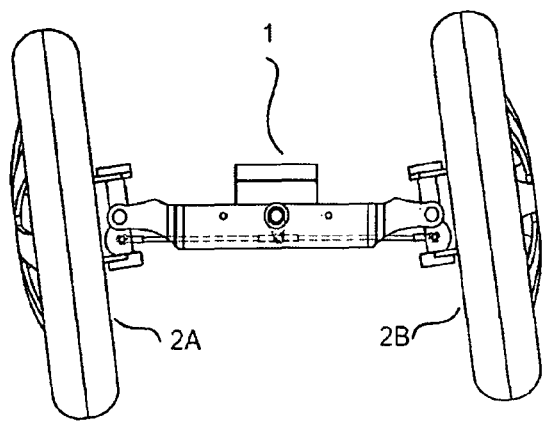
FIG. 10 is a schematic view showing the operation of sway of the second embodiment of the present invention.
Figure 11:
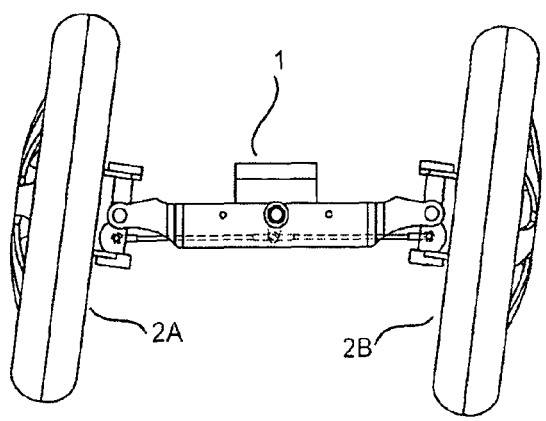
FIG. 11 is a schematic view showing the operation of sway of the second embodiment of the present invention.

What is claimed is:

1. A linkage mechanism for double-wheel combination of vehicle comprising:
    a linking block for receiving a center axle;
    the center axle arranged to the linking block; a sway block being pivoted to the center axle;
    a connecting rod pivoted to the sway block of the center axle;
    a main frame; wherein the main frame is assembled by a front frame and a rear frame; the center axle is axially retained by through holes formed to the front frame and the rear frame respectively; the two sway rods are pivoted to at least one of the front frame and the rear frame; and
    two sway rods pivoted to two ends of the main frame; the sway rods being pivoted to two ends of the connecting rod respectively; and
    wherein the two sway rods will sway simultaneously and identically through the linking of the connecting rod; and
    wherein the sway rod is covered by a side shield; and
    wherein the sway rod includes a rod body having an upper section and lower section; the outer diameters of the upper section and lower section are smaller than that of the rod body; the side shield is approximately a cap body covering the sway rod; the side shield has two through holes on the top and the bottom thereof for receiving the upper section and the lower section of the sway rod respectively.

2. The linkage mechanism for double-wheel combination of vehicle as claimed in claim 1, wherein the rod body of the sway rod has a coaxial front protruding axle and rear protruding axle formed radially to the rod body; the rear frame has a fork on both lateral sides thereof; the fork has two through holes for receiving the front protruding axle and the rear protruding axle of the rod body respectively.

3. The linkage mechanism for double-wheel combination of vehicle as claimed in claim 1, wherein the rod body of the sway rod has a coaxial front protruding axle and rear protruding axle formed radially to the rod body; the front protruding axles of the two sway rods are pivoted by two through holes on two lateral ends of the front frame, and the rear protruding axles of the two sway rods are pivoted by two through holes on two lateral ends of the rear frame.

4. The linkage mechanism for double-wheel combination of vehicle as claimed in claim 1, wherein the front frame is smaller than the rear frame, and the front frame is embedded into a cut of the rear frame.

5. The linkage mechanism for double-wheel combination of vehicle as claimed in claim 1, wherein the connecting rod is exposed below the front frame and the rear frame.

* * * * *